(12) United States Patent
Nan (10) Patent No.: US 11,301,842 B2
(45) Date of Patent: Apr. 12, 2022

(54) CPK-BASED DIGITAL BANK, DIGITAL CURRENCY, AND PAYMENT METHOD

(71) Applicant: JS Bochtec Co., LTD., Beijing (CN)

(72) Inventor: Xianghao Nan, Beijing (CN)

(73) Assignee: JS BOCHTEC CO., LTD., Beijing (CN)

(*) Notice: Subject to any disclaimer, the term of this patent is extended or adjusted under 35 U.S.C. 154(b) by 29 days.

(21) Appl. No.: 16/464,938

(22) PCT Filed: Nov. 27, 2017

(86) PCT No.: PCT/CN2017/113017
§ 371 (c)(1),
(2) Date: May 29, 2019

(87) PCT Pub. No.: WO2018/099336
PCT Pub. Date: Jun. 7, 2018

(65) Prior Publication Data
US 2020/0013044 A1    Jan. 9, 2020

(30) Foreign Application Priority Data
Nov. 29, 2016  (CN) .......................... 201611077666.2

(51) Int. Cl.
*G06Q 20/36*  (2012.01)
*G06Q 20/06*  (2012.01)
(Continued)

(52) U.S. Cl.
CPC ....... *G06Q 20/3674* (2013.01); *G06Q 20/065* (2013.01); *G06Q 20/3829* (2013.01);
(Continued)

(58) Field of Classification Search
None
See application file for complete search history.

(56) References Cited

U.S. PATENT DOCUMENTS

| 2015/0254640 A1 | 9/2015 | Cassano et al. |
| 2016/0162897 A1 | 6/2016 | Feeney |

FOREIGN PATENT DOCUMENTS

| CN | 1858795 A | 11/2006 |
| CN | 103400267 A | 11/2013 |

(Continued)

OTHER PUBLICATIONS

China Academic Journal Electronic Publishing House "The conception of digital currency and its influence on the central bank" 1994-2021, http://www.cnki.net. English translation attached.

(Continued)

*Primary Examiner* — Jeffrey C Pwu
*Assistant Examiner* — Mayasa A. Shaawat
(74) *Attorney, Agent, or Firm* — Volpe Koenig (57) ABSTRACT

Disclosed are a CPK-based digital bank, a digital currency and a payment method. The digital currency is a core component of the digital bank. The digital currency is realized by means of a CPK digital signature, and a payer provides an account authenticity certification, an amount authenticity certification and a fund allocation authenticity certification, thereby effectively preventing crimes inside or outside a bank. The digital currency directly takes an account identifier as an account number. The digital currency can be used in on-line operations, as well as off-line operations, thereby satisfying face-to-face trade requirements between a great number of retail accounts. The CPK digital bank is realized by means of a CPK chip without support of other devices, such that everyone can check the authenticity of the digital currency.

3 Claims, 1 Drawing Sheet

(51) Int. Cl.
   *G06Q 20/38*      (2012.01)
   *G06Q 20/40*      (2012.01)
   *H04L 9/32*       (2006.01)
   *H04L 9/30*       (2006.01)
(52) U.S. Cl.
   CPC ....... *G06Q 20/4014* (2013.01); *H04L 9/3073* (2013.01); *H04L 9/3247* (2013.01); *H04L 9/3263* (2013.01)

(56) References Cited

FOREIGN PATENT DOCUMENTS

| | | | |
|---|---|---|---|
| CN | 105096119 | A | 11/2015 |
| CN | 105407079 | A | 3/2016 |
| CN | 106779696 | A | 5/2017 |
| EP | 2285040 | A1 | 2/2011 |
| GB | 2537683 | A | 10/2016 |
| WO | 2007121631 | A1 | 11/2007 |
| WO | 2015134890 | A1 | 11/2015 |

OTHER PUBLICATIONS

Ku, M. et al. "Combined Public Key Cryptosystem Based on Conic Curves Over the Ring Zn" (2008) 2008 International Conference on Computer Science and Software Engineering. IEEE Computer Society: 631-634.

Liu, J. et al. A Key Management and Authentication Model For Ad Hoc Network (2007) The 18th Annual IEEE International Symposium on Personal, Indoorand Mobile Radio Communications (PIMRC07) IEEE.

CPK-BASED DIGITAL BANK, DIGITAL CURRENCY, AND PAYMENT METHOD

CROSS REFERENCE TO RELATED APPLICATIONS

The present application is a 35 USC 371 national stage application of PCT/CN2017/113017, which claims the priority of the Chinese patent application No. 201611077666.2, entitled "CPK-Based Digital Bank, Digital Currency, and Payment Method," filed on Nov. 29, 2016, both of which are incorporated herein by reference as if fully set forth.

FIELD OF THE INVENTION

The present invention relates to the field of electronic technologies, information processing, and currency security, and specifically, to a CPK-based digital currency system and a payment method.

BACKGROUND OF THE INVENTION

With in-depth development of online transactions, a demand for a digital bank has arisen. The digital bank dominated by electronic bills and remote transactions is very different from a current bank dominated by paper cash and face-to-face transactions, and then new security requirements are generated. Details are shown in the following table:

| event | type of event | current bank | digital bank |
|---|---|---|---|
| bank-external event | illegal access copy attack data protection integrity certification | password verification code symmetric encryption data signature | sender signature verification code asymmetric encryption no need |
| bank-internal event | issuing bank certification currency certification account certification amount certification flow certification | none none none none none | issuing bank signature issuing bank signature account signature account signature account signature |
| event between events | trust transfer hacking | trust transfer | blocking delivery code authentication |

From the security requirements of the above table, a bank-internal threat is far greater than a bank-external threat. In addition, the technical requirements are also very high, and a digital currency basically meets the requirements of the digital bank.

In addition to meeting requirements of online operations, the digital currency can also meet requirements of offline operations. The online operations are available for online transactions for group purchase, while the offline operations are available for face-to-face transactions between individual customers. The digital currency can be expressed in an electronic form of the online operations or in a paper form of the offline operations.

A digital signature is required to complete all certifications of the digital currency. Currently, a CPK authentication system can provide a digital signature, and the digital signature is a short signature (the signature code has a length of only 12 bytes).

SUMMARY OF THE INVENTION

In view of this, an objective of the present invention is to provide a CPK-based digital currency system and a payment method. To achieve the above objective for the system, the present invention provides the following technical solution:

the present invention provides a CPK-based digital bank and a digital currency. The digital bank is set on a virtual network, the virtual network is an identifier-to-identifier authentication network, and a basic identifier of the digital bank includes an account name, a bank name, and a firm name. The basic identifier meets uniqueness, recognition, and provability. The digital bank includes a plurality of digital currencies, and the digital currency is provided with an account identifier unit, an issuer authenticity certification unit, a digital currency authenticity certification unit, an account number authenticity certification unit, and an amount authenticity certification unit.

The account identifier unit is used to store the account name, the bank name, and the firm name.

The issuer authenticity certification unit is used to verify authenticity of the digital currency issuing bank.

The digital currency authenticity certification unit is used to verify authenticity of the digital currency.

The account number authenticity certification unit is used to verify authenticity of an account.

The amount authenticity certification unit is used to verify authenticity of the digital currency amount.

Further, the digital currency includes a valueless currency, and the valueless currency is provided with the issuer authenticity certification unit and the digital currency authenticity certification unit.

The issuer authenticity certification unit is used to verify authenticity of the issuing bank.

The digital currency authenticity certification unit is used to verify authenticity of a serial number.

The issuer authenticity certification unit verifies the authenticity of the issuing bank by using a signature on a time performed by the issuing bank. The digital currency authenticity certification unit verifies the authenticity of the serial number by using a signature on a serial number performed by the issuing bank. Specific steps are as follows:

$SIG_{bank}(time1)=(s1,c1)=sign1$;
$SIG_{bank}(serial\text{-}no)=(s2,c2)=sign2$; wherein SIG is a signature function, bank (lowercase and italic) is a Bank private key, and time1 indicates a signature time; s1 is a signature code, c1 is a verification code, and indicates a signature code and a verification code; serial-no is a serial number of a digital currency; s2 is a signature code, and c2 is a verification code; and sign2 indicates a signature code and a verification code.

Further, the issuer authenticity certification unit and the digital currency authenticity certification unit of the valueless currency constitute a data packet data1, and provide a quick response code 1. The quick response code 1 is indicated by QR1, and is used for automatic reading by the other party. The data packet is constructed in the following manner.

Data1={bank, time1, sign1, serial-no, sign2}.

The other party reads contents of the quick response code and verifies the contents one by one in the following manner:

$VER_{BANK}(time1, s1)=c1'$;
$VER_{BANK}(serial\text{-}no, s2)=c2'$; wherein

VER is a verification function, BANK indicates a bank public key; the bank public key is indicated by uppercase and italic alphabetic symbols;

if c1=c1', it proves that the issuer is true; and if c2=c2', then it proves that the serial number is true, and it proves that a blank digital currency is true.

Further, the digital currency includes a valuable currency, and the valuable currency is provided with the account identifier unit and the amount authenticity certification unit.

The account identifier unit is used to verify authenticity of the account. The amount authenticity certification unit is used to verify authenticity of the amount. Specific steps are as follows:

$SIG_{account}(time2)=(s3,c3)=sign3$
$SIG_{account}(amount)=(s4,c4)=sign4$; wherein
SIG is a signature function, account is an account private key, s3 and s4 are signature codes, c3 and c4 are verification codes, and sign3 and sign4 indicate a signature code and a verification code.

Further, the account identifier unit and the amount authenticity identification unit of the valuable currency provide data by using a quick response code 2, the quick response code 2 is indicated by QR2, and is used to enable anyone to perform authenticity offline verification. The QR2 is constructed in the following manner:

QR2={account, time2, sign3, amount, sign4}.

Any account verifies authenticity of a payment account and authenticity of an amount in the quick response code 2;

$VER_{ACCOUNT}(time2,s3)=c3'$;
$VER_{ACCOUNT}(amount,s4)=c4'$; wherein
VER is a verification function, ACCOUNT indicates an account public key, and amount indicates the amount:

if c3=c3', it proves that the account is true, and if c4=c4', it proves that the amount is true.

Further, the digital currency provides a quick response code. The quick response code is printed on paper, or stored in an electronic device.

The present invention further provides a CPK-based digital currency payment method, including the following steps.

S1: A payee notifies a payment account of a payee amount, and the account determines a digital currency amount that needs to be paid. The notification method is implemented by using an account authenticity certification provided by an account identifier signature unit and an amount authenticity certification provided by a data signature unit:

$SIG_{firm}(time)=(s5,c5)=sign5$;
$SIG_{firm}(amount)=(s6,c6)=sign6$; wherein firm is a private key of a film, and the firm is the payee; and time is a signature time, and amount indicates the amount;

S2: The payee packs the above data into data 1 and a quick response code 1, and sends the data 1 and the quick response code 1 to the payment account;

data1={firm, time, sign1, sign2, amount};

S3: The payment account checks authenticity of the firm in and authenticity of the amount according to the following formula:

$VER_{FIRM}(time, s5)=c5'$;
$VER_{FIRM}(amount, s6)=c6'$; wherein
VER is a verification function, and FIRM is a public key of the firm;

S4: The payment account calls out the quick response code 1 of a valueless currency, and a bank authenticity certification and a serial number authenticity certification are performed on the valueless currency by an issuing bank:

$SIG_{bank}(time)=(s1,c1)=sign1$;
$SIG_{bank}(serial-no)=(s2,c2)=sign2$; wherein bank is a private key of a digital currency issuing bank;

S5: The payment account fills in the amount in the valueless currency, and provides the account authenticity certification and the amount authenticity certification which constitute a data packet data2 and a quick response code 2:

$SIG_{account}(time)=(s3,c3)=sign3$;
$SIG_{account}(amount)=(s4,c4)=sign4$;
Data2={account, time, sign3, amount, sign4};

evidence of a fund flow is provided by the payment account according to the following formula:

$SIG_{account}(firm)=sign5$; wherein
account is a private key of the payment account, and firm is a payee firm name;

S6: The payment account sends a data packet data to the bank, and the data includes data1, data2, and a fund flow certification {firm,sign5}.

The data packet can be sent in an encryption manner:

rG=key;
$E_{key}(data)=code$;
$ENC_{BANK}(key)=β$; wherein
E is a symmetric encryption function, and ENC is an asymmetric encryption function;

The account sends code and β to the bank;

S7: The bank receives the data, and if the data is encrypted, decryption is first performed:

$DEC_{bank}(β)=key$;
$D_{key}(code)=data$;
Data={data1, data2, firm, sign5}: wherein
Data1={bank, time 1,sign1, serial-no, sign2}:
Data2={account, time, sign3, amount, sign4}: wherein
the bank checks authenticity item by item, including authenticity of the valueless currency of data1, authenticity of a valuable currency of data2, and authenticity of a fund flow of firm and sign5;

S8: After verification is completed, the bank makes a settlement. When making a settlement, the bank must keep an authenticity certification of the payment account, a fund withdrawal authorization certification of the payment account, and a fund flow certification of the payment account; and then the bank issues a settlement notification to the firm, and contents of the notification include the bank authenticity certification and the amount authenticity certification Which constitute a data packet data3; and specifics are as follows:

$SIG_{bank}(time)=(s7, c7)=sign7$;
$SIG_{bank}(amount)=(s8, c8)=sign8$;
data3={bank, time, sign7, amount, sign8};

S9: data 3 is sent in an encryption manner:
rG=key;
$E_{key}(data3)=code3$;
$ENC_{FIRM}(key)=β$.

The bank sends code 3 and β to the firm; wherein
r is a random integer, G is a base point of an elliptic curve, key is a randomly generated symmetric key and used for data encryption; under an action of the key, the data data3 is encrypted to obtain a password code3; and then the key is encrypted by using a public key FIRM of the other party to obtain a key β;

S10: After receiving the bank settlement notification, the firm verifies authenticity of the bank settlement notification, and issues a receipt to a payer; and if the notification is encrypted, decryption is performed:

$DEC_{firm}(β)=key$;
$D_{key}(code3)=data3$;
Data3={bank, time, sign7, amount, sign8}; wherein
sign7 is the bank authenticity certification, and sign8 is the amount authenticity certification;

S11: The firm verifies the bank authenticity certification and the amount authenticity certification in the bank settlement notification:

$VER_{BANK}(time)=(s7, c7)=sign7;$
$VER_{BANK}(amount)=(s8, c8)=sign8;$

S12: The firm issues the receipt, wherein the receipt includes firm authenticity certification and the amount authenticity certification which are made into a data packet data3 and provide a quick response code 3, wherein the quick response code 3 is indicated by QR3:

$SIG_{firm}(time)=(s9, c9)=sign9;$
$SIG_{firm}(500\ RMB)=(s10, c10)=sign10;$
Data4={firm, time, sign9, amount, sign10}; wherein sign9 indicates the authenticity of the firm; and sign10 indicates the authenticity of the amount.

Further, the method further includes the following step:

S13: the receipt is printed on paper or an invoice.

Beneficial effects of the present invention are as follows:
compared with the prior art, the CPK-based digital currency system and the payment method provided by the present invention have the following advantages.

1. An account identifier of a digital bank includes an address and an account number. There is no need to make a definition separately.

2. The digital bank operates on a CPK-based virtual network, directly provides a basis for access control to prevent illegal access.

3. An intelligent terminal of the digital bank uses a dual security kernel. An original kernel continues to be responsible for running security of a code. The newly added CPK kernel is responsible for authentication of the code to prevent power from being taken over and attacked by a hacker.

4. The CPK system is downloaded from a network for usage, so that users naturally have an anti-counterfeiting verification function and a code authentication function. Data encryption and voice encryption communication may be performed between digital bank accounts, and a global future network is naturally constituted.

5. A digital currency has a same status as a current currency. Digital currency holders can convert the digital currency into the current currency at a bank counter as long as that a currency validity certification is provided.

6. The digital currency can exist in two forms. The digital currency is printed on paper and exists in a paper form. Because a quick response code is provided, offline checking may be performed on authenticity. Alternatively, the digital currency can be electronically stored in an electronic device in a form of a quick response code.

7. An account of a payer has a right to completely control the digital currency, and no third party, including the bank, has the right to control the digital currency. Therefore, copying and loss of the valid digital currency do not cause harm, a possibility of bank internal crimes is effectively prevented, external crimes and money laundering activities are also prevented, and security of bank funds is not affected even when bank data is leaked.

8. The receipt can be turned into an invoice if the receipt is printed on paper provided by tax.

The digital currency provided by the present invention can be used for transactions between banks, and provides another new way for face-to-face transactions in accounts. The system is simple and practicable, and meets needs of public and networked development, representing a new direction for development of a banking industry. Key issues of security of the digital bank and the digital currency are solved, and security has made a qualitative leap compared with traditional banking systems and paper currency systems. Therefore, there is no doubt that many new application areas will be opened up by using the digital currency.

BRIEF DESCRIPTION OF DRAWINGS

To make the objectives, technical solutions, and beneficial effects of the present invention clearer, the present invention provides the following accompanying drawing for description.

DETAILED DESCRIPTION OF THE EMBODIMENTS

The following describes the preferred embodiments of the present invention in detail with reference to the accompany drawing.

The embodiments provide a digital bank based on a combination public key (CPK) system.

The CPK is an identifier-based combination public key, and is composed of a combination matrix. The matrix is divided into a public key matrix and a private key matrix. On an elliptic curve, G is a base point. If any integer a is a private key, then aG=A, and A is a public key corresponding to a. Assuming that an identifier is Alice, then public and private keys of Alice are obtained in the following manner the identifier is transformed into a random number sequence through Hash transformation, the random number sequence is taken as coordinates of the matrix, and variables on the 32 coordinates are separately accumulated to obtain the public and private keys. For example:

$ALICE \rightarrow \Sigma_{i=1}^{32} \Sigma_{j=i}^{32} R_{i,j} \rightarrow ALICE$ (uppercase, italic, indicating the public key);

$ALICE \rightarrow \Sigma_{i=1}^{32} \Sigma_{j=1}^{32} r_{i,j} \rightarrow alice$ (lowercase, italic indicating the private key).

Because the public key matrix ($R_{i,j}$) is available to everyone, the public key can be calculated provided that the identifier is known. However, the private key matrix ($r_{i,j}$) is kept only in a key management center (KMC).

The CPK has a digital signature function and a key encryption function. Key encryption is used for secret delivery of the keys.

The digital bank is established on an autonomously controllable virtual network.

The virtual network is an identifier-to-identifier interconnection authentication network, which is referred to as an I to I authentication mode. A basic identifier used by the digital bank is an account name (an account number), and further relates to a bank name and a firm name. The identifier used in the virtual network must meet uniqueness, recognition, and provability. The virtual network is independent and traceable. Independence separates networks from each other, separates events from each other, and blocks transfer of any trust relationship, so that takeover of system rights is prevented, autonomous control of the network is ensured, illegal access is directly prevented at the same time.

A digital currency is a core component of the digital bank.

Issuance of the digital currency is carried out by a digital bank system. The digital currency and a current currency are exactly the same in properties, but are different in management methods. As far as the current currency is concerned, when funds are placed in a bank, the bank has a right to save the funds and perhaps also has a right to control the funds. Therefore, the bank cannot prevent a possibility of internal crimes. As far as the digital currency is concerned, funds are always placed in a bank, and the bank only has a right to save the funds, but has no right to control the funds, so that a possibility of internal crimes is prevented. Because only a payment account has a full right to control the funds, loss of the digital currency does not affect security.

Various authenticity certifications of the digital currency are implemented by digital signatures.

There are two kinds of digital signatures: one is an identifier signature, and the other is a data signature. The identifier signature is a signature that certifies identifier authenticity, and is implemented by a signature on a time performed by an identifier. The data signature is a signature that certifies data authenticity, and is implemented by a signature on a data feature performed by an identifier.

In the digital bank payment system, incoming and outgoing data packets can be encrypted. Encryption of data is generally performed by using a traditional password. A symmetric key used for encryption is randomly generated, and the CPK is used to encrypt the key for delivery, and only a specified receiver can perform decryption.

For the digital currency provided in this embodiment, at least authenticity of the digital currency issuing bank, authenticity of the currency, authenticity of the account (the account number), and authenticity of an amount need to be certificated.

Issuance of a blank digital currency:

the blank digital currency is issued by a digital bank (bank). Each digital currency has an issuance time and a serial number (serial-no).

An authenticity certification of the blank digital currency includes an issuer authenticity certification and a serial number authenticity certification.

The issuer authenticity certification is a signature on a time performed by the issuer, and the serial number authenticity certification is a signature on a serial number performed by the issuer.

The digital currency authenticity certification provides a quick response code 1 for automated verification.

Validity of the digital currency:

a blank digital currency holder must turn a real blank digital currency into a valid digital currency.

A digital currency validity certification includes an account authenticity certification and an amount authenticity certification. The digital currency system no longer sets an account, and an account identifier can be directly used as an account number.

The account authenticity certification is a signature on a time performed by the account, and the amount authenticity certification is a signature on an amount performed by the account.

The digital currency validity certification provides a quick response code 2 for automated verification.

Payment of the digital currency:

a payer must provide evidence of the authenticity of the digital currency, evidence of the validity of the digital currency, and evidence of the fund flow to the bank. The evidence of the fund flow is a signature on a payee account performed by the payment account.

All signatures and verifications are implemented by using the CPK. The system has a CPK public key matrix, and anyone can calculate the public key. Therefore, verification can be done by everyone without a special device.

The digital currency in this embodiment is divided into a valueless currency, a valuable currency, and a valid currency.

The valueless digital currency:

the valueless currency is a blank currency that is composed of an issuing bank (bank) and a serial number (serial-no). The issuer authenticity certification is a signature on a time (time) performed by the issuing bank (bank). The digital currency authenticity certification is a signature on a serial number (serial-no) performed by the issuing bank:

$SIG_{bank}(time1)=(s1, c1)=sign1;$
$SIG_{bank}(serial-no)=(s2, c2)=sign2.$

The blank digital currency provides a quick response code, and anyone can perform offline verification to verify authenticity of the blank digital currency:

QR1={bank, time1, sign1, serial-no, sign2}; wherein

SIG is a signature function, and lowercase and italic bank is a private key of the bank.

Verifying of authenticity of the issuing bank and authenticity of the serial number is as follows:

$VER_{BANK}(time1, s1)=c1;$
$VER_{BANK}(serial-no, s2)=c2'.$

If c1=c1', it proves that the issuer is true. If c2=c2', it proves that the serial number is true, and it proves that the blank digital currency is true.

Wherein VER is a verification function, and uppercase and italic BANK is a public key of the bank.

The valuable digital currency:

the valuable digital currency is composed of an account and an amount, and the amount is filled in by the account on a basis of a blank digital currency. The valuable digital currency provides the authenticity of the account and the authenticity of the amount.

$SIG_{account}(time2)=(s3, c3)=sign3;$
$SIG_{account}(amount)=(s4, c4)=sign4.$

The valuable digital currency provides a quick response code, and anyone can perform offline verification to verify authenticity of the valuable digital currency:

QR2={account, time2, sign3, amount, sign4}.

Verification of the valid digital currency is carried out on a basis of the authenticity verification of the blank digital currency, to verify the authenticity of the account and verifying the authenticity of the amount.

$VER_{ACCOUNT}(time2, s3)=c3';$
$VER_{ACCOUNT}(amount, s4)=c4'.$

If c3=c3', it proves that the account is true, and if c4=c4', it proves that the amount is true. The valueless currency and the valuable quick response code together form a valid digital currency.

The valid digital currency:

the valid digital currency is made up of a valueless currency and a valuable currency.

Payment of the digital currency:

no matter whether the valid digital currency is an electronic digital currency or a paper digital currency, the valid digital currency has a same circulation function as the current fixed currency.

Figure 1:
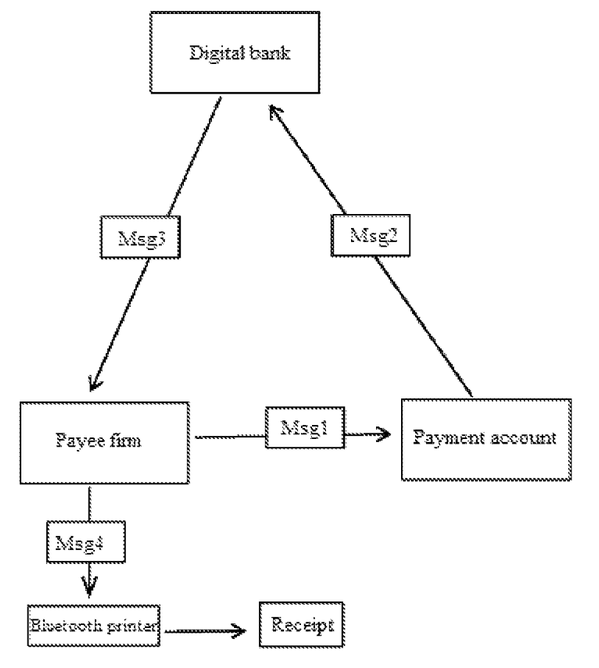
FIG. 1 is a flowchart of a digital bank payment process.

As shown in FIG. 1, FIG. 1 is a flowchart of a digital bank payment process. The digital bank payment is composed of a payment account, a payee firm, and a digital bank. MSG1 in FIG. 1 includes two segments of data. For the first segment of data, a virtual network is established between the payment account and the payee firm, and a connection authenticity certification is provided for each other. The second segment of data includes a firm authenticity certification and an amount authenticity certification. MSG2 includes two segments of data. For the first segment of data, a virtual network is established between the payment account and the bank, a connection authenticity certification is provided for each other with a question and an answer of an anti-DOS attack included; the second segment of data includes a transaction list submitted by the payment account to the bank, and the transaction list includes a payment account authenticity certification, a certification of an authorized amount of the payment account, and an approval certification of the fund flow of the payment account. MSG3 includes two segments of data. For the first segment of data, a virtual network is established between the bank and the payee film, and the bank provides a connection authenticity certification; the second segment of data is a bank settlement notification. MSG4: the firm gives a receipt to the payment account, and the receipt includes a firm authenticity certification and an amount authenticity certification.

Payment is used as an example. 500 RMB is spent by an account in a firm, and a payment process is as follows:

A payee firm will notify the payment account of the payee amount of 500 RMB, and a method of notification is to provide a firm authenticity certification and an amount authenticity certification:

$SIG_{firm}(time)=(s5, c5)=sign5$;
$SIG_{firm}(500\ RMB)=(s6, c6)=sign6$.

The firm sends data1 to the payment account.
data1=(firm,time,sign1,sign2, 500 RMB);
Data1 can be encrypted in an encryption manner
rG=key;
$E_{key}(data1)=code1$;
$ENC_{ACCOUNT}(key)=\beta$.

The firm sends code1 and $\beta$ to the account.

E is a symmetric encryption function, and ENC is an asymmetric encryption function.

The account verifies authenticity of the firm and the amount, if the data is encrypted, current decryption is performed:

$DEC_{account}(\beta)=key$;
$D_{key}(code1)=data1$;
Data1={firm, time, sign1, sign2, 500 RMB}.

If the data is encrypted, whether the data is decrypted or not can be used as a basis for a provable connection.

DEC is an asymmetric decryption function, and D is a symmetric decryption function.

The account verifies the authenticity of the firm and the authenticity of the amount:

$VER_{FIRM}(time, s5)=c5'$;
$VER_{FIRM}(500\ RMB, s6)=c6'$.

The firm authenticity certification is actually a basis of a provable connection.

The account calls out a blank currency. The bank authenticity certification and the serial number authenticity certification have been provided in a quick response code 1. There is no need to repeat. For example:

$SIG_{bank}(time1)=(s1, c1)=sign1$;
$SIG_{bank}(serial-no)=(s2, c2)=sign2$.

The account fills in the amount in the blank currency, and provides the account authenticity certification and the amount authenticity certification, to form a quick response code 2:

$SIG_{account}(time2)=(s3, c3)=sign3$;
$SIG_{account}(500\ RMB)=(s4, c4)=sign4$.

Evidence of the fund flow is provided:
$SIG_{account}(firm)=sign5$.

The account sends data2={a quick response code 1, a quick response code 2, a flow certification} to the bank. Data2 can be sent in an encryption manner:

rG=key;
$E_{key}(data2)=code2$;
$ENC_{BANK}(key)=\beta$.

The account sends code2 and $\beta$ to the bank.

A specific process of submitting data described in this embodiment is as follows:

A provable connection is established between an account and a bank:

the account sends an account authenticity certification:
$SIG_{account}(time3)=(s6, c6)=sign6$.

The bank verifies authenticity of the account:
$VER_{ACCOUNT}(time3, s6)=c6'$.

If c6=c6', the bank sends a random number r as a measure for an anti-DOS attack measure; the account responds to a signature of r:

$SIG_{account}(r)=(s7, c7)=sign7$;
the bank checks the response to r:
$VER_{ACCOUNT}(r, s7)=c7$;

If c7=c7', it proves that the account is true, and data2={code2, $\beta$}, sent by the account is received; and if the data is encrypted, decryption is first performed:

$DEC_{bank}(\beta)=key$:
$D_{key}(code2)=data2$;
Data2={a quick response code 1, a quick response code 2, a fund flow certification sign5};

the bank checks the quick response code 1: QR1={bank, time1, sign1, serial-no, sign2};
$VER_{BANK}(time1, s1)=c1'$;
$VER_{BANK}(serial-no, s2)=c2'$;

the bank checks the quick response code 2: QR2={account, time2, sign3, 500 RMB, sign4, firm};
$VER_{ACCOUNT}(time2, s3)=c3'$;
$VER_{ACCOUNT}(500\ RMB, s4)=c4'$;
$VER_{FIRM}(time2, s3)=c3'$.

The bank checks the fund flow:
$VER_{ACCOUNT}(500\ RMB, s5)=c5'$.

The bank has obtained evidence of account authenticity, evidence of amount authenticity, and evidence of flow authenticity by checking data2. The above three pieces of evidence constitute a basic chain of evidence, and the bank must keep them properly. All the evidence is provided by using a signature of the payment account, and is invalid without the signature code, so that autonomous control of the payment account is implemented. A bank statement includes, for example:

| account authenticity | | Amount authenticity | | Flow authenticity | |
| --- | --- | --- | --- | --- | --- |
| Time2 | Sign3 | $500_{RMB}$ | Sign4 | firm | Sign5 |

After closing the transaction, the bank sends a notification that the amount 500 RMB is received to the firm, including:

a bank authenticity certification:
$SIG_{bank}(time4)=(s8, c8)=sign8$;
an amount authenticity certification:
$SIG_{bank}(500\ RMB)=(s9, c9)=sign9$.

The bank sends a data packet to the firm:
data3={bank, time4, sign8, 500, sign9}.
Data3 can be sent in an encryption manner
rG=key;
$E_{key}(data3)=code3$;
$ENC_{FIRM}(key)=\beta$;
the bank sends code3 and $\beta$ to the firm.

A process of establishing a connection between the bank and the firm is as follows:

the bank sends the bank authenticity certification:
$SIG_{bank}(time5)=(s10, c10)=sign10$;
the firm checks the bank authenticity:
$VER_{BANK}(time5, s10)=c10'$;

if c10=c10', the firm receives a bank settlement notification data3. If the settlement notification is encrypted, decryption is first performed:

$DEC_{firm}((3)=key$;
$D_{key}(code3)=data3$;
Data3={bank, time4, sign8, 500 RMB, sign9}.

The firm first verifies authenticity of the bank settlement notification:

$VER_{BANK}(time4)+(s8, c8)=sign8;$
$VER_{BANK}(500\ RMB)+(s9, c9)=sign9;$
the firm issues a receipt (or an invoice), including the firm authenticity and the amount authenticity:
$SIG_{firm}(time6)=(s10, c10)=sign10;$
$SIG_{firm}(500\ RMB)=(s11, c11)=sign11;$
the receipt provides a quick response code:
Data4={firm, time6, sign10, 500 RMB, sign11}.

At this point, a payment process is successfully completed. In a payment operation, the account can submit data to the bank in two manners. In a first manner, the payment account is responsible for submitting, which is similar to the example described above, it is impossible to generate a copy attack in this manner, but inconvenience is brought to circulation of the digital currency; in a second manner, the payee account is responsible for submitting, and convenience is brought to circulation of the digital currency, but the copy attack easily occurs. However, it is easy to find this kind of copy attack provided that the repetitive account is checked when the bank makes a settlement.

Finally, it should be noted that the foregoing preferred embodiments are only intended for describing the technical solutions of the present invention other than limiting the present invention. Although the present invention is described in detail with reference to the foregoing preferred embodiments, persons of ordinary skill in the art should understand that they may still make various modifications to forms and details without departing from the scope specified in claims of the present invention.

The invention claimed is:

1. A combination public key based digital currency payment method, comprising the following steps:

S1: a payee notifies a payment account of a payee amount, and the account determines an amount of a digital currency that needs to be paid; and the notification method is implemented by an authenticity certification of the account and an authenticity certification of an amount:
$SIG_{firm}(time1)=(s5, c5)=sign5;$
$SIG_{firm}(amount)=(s6, c6)=sign6;$
wherein
SIG is a signature function, firm is a private key of a identity corresponding to the payee, the private key of the firm identity is indicated by lowercase and italic alphabetic symbols; and time1 indicates a signature time, and amount indicates the amount;

S2: the payee packs the above data into data1 and a quick response code 1, and sends the data1 and the quick response code 1 to the payment account;
data1={Firm, time1, sign1, sign2, amount};
wherein Firm is a firm identity corresponding to the payee:

S3: the payment account checks authenticity of the firm and authenticity of the amount according to the following formulas:
$VER_{FIRM}(time1, s5)=c5';$
$VER_{FIRM}(amount, s6)=c6';$
wherein
VER is a verification function, and FIRM is a public key of the firm identity corresponding the payee, the public key of the firm identity is indicated by lowercase and italic alphabetic symbols;

S4: the payment account calls out data2 and a quick response code 2 of an authenticity certification a valueless digital currency, and the authenticity certification of the valueless digital currency comprises an authenticity certification of an issuer and an authenticity certification of a serial number:
$SIG_{bank}(time2)=(s1, c1)=sign1;$
$SIG_{bank}(serial\text{-}no)=(s2, c2)=sign2;$
data2={Bank,time2,sign1,serial-no,sign2};
wherein
bank is a private key of the bank identity of the issuer, the private key of the bank is identity is indicated by lowercase and italic alphabetic symbols, and Bank is the bank identity of the issuer; time2 indicates a signature time; serial-no is the serial number of the valueless digital currency;

S5: the payment account fills in the amount in the valueless digital currency, and provides an authenticity certification of a valuable digital currency which constitutes a data packet data3 and a quick response code 3:
$SIG_{account}(time3)=(s3, c3)=sign3;$
$SIG_{account}(amount)=(s4, c4)=sign4;$
data3={Account, time3, sign3, amount, sign4};
evidence of an authenticity certification of a fund flow is provided by the payment account according to the following formulas:
$SIG_{account}(Firm)=sign7;$
wherein
account is a private key of the payment account, and the private key of the payment account is indicated by lowercase and italic alphabetic, symbols; time3 indicates a signature time;

S6: the payment account sends a data packet data to the bank, and the data comprises data2, data3, and the authenticity certification of the fund flow {Firm, sign7};
the data packet can be sent in an encryption manner:
rG=key;
$E_{key}(data)=code1;$
$ENC_{BANK}(key)=\beta1;$
wherein
E is a symmetric encryption function, and ENC is an asymmetric encryption function; and Bank is a public key of the bank identity, and the public key of the bank identity is indicated by uppercase and italic alphabetic symbols;
the account sends code1 and $\beta1$ to the bank;

S7: the bank receives the data, and if the data is encrypted, decryption is first performed:
$DEC_{bank}(\beta1)=key;$
$D_{key}(code1)=data;$
data={data2, data3, Firm, sign7};
wherein
data2={Bank, time2, sign1, serial-no, sign 2};
data3={Account, time3, sign3, amount, sign4};
wherein DEC is an asymmetric decryption function, and D is a symmetric decryption function;
the bank checks authenticity item by item, comprising authenticity of the valueless digital currency; authenticity of the valuable digital currency and authenticity of the fund flow;

S8: after verification is completed, the bank makes a settlement; when making a settlement, the bank must keep an authenticity certification of the payment account, a fund withdrawal of amount authenticity certification of the payment account, and a fund flow of fund flow authenticity certification of the payment account; and then the bank issues a settlement notification to the payee, and contents of the settlement notification comprise the authenticity certification of the bank and the authenticity certification of the amount which constitute a data packet data4; and specifics are as follows:

$SIG_{bank}(time4)=(s8, c8)=sign8;$
$SIG_{bank}(amount)=(s9, c9)=sign9;$
data4={Bank, time4, sign8, amount, sign9};
S9: data4 is sent in an encryption manner:
rG=key;
$E_{key}(data4)=code2;$
$ENC_{FIRM}(key)=β2;$
the bank sends code 2 and β2 to Firm;
wherein
r is a random integer, G is a base point of an elliptic curve, key is a randomly generated symmetric key and used for data encryption; under an action of the key, the data data4 is encrypted to obtain a password code2; and then the key is encrypted by using a public key FIRM of the payee to obtain a key β2 of a symmetric key;
S10: after receiving the settlement notification of the bank, the payee verifies authenticity of the settlement notification of the bank, and issues a receipt to the payment; and if the notification is encrypted, decryption is performed:
$DEC_{firm}(β2)=key$
$D_{key}(code2)=data4;$
data4={Bank, time4, sign8, amount, sign9};
wherein
sign8 is the authenticity certification of the bank, and sign9 is the authenticity certification of the amount;

S11: the payee verifies the authenticity certification of the bank and the authenticity certification of the amount in the settlement notification of the bank:
$VER_{BANK}(time4,s8)=c8';$
$VER_{BANK}(amount,s9)=c9';$
S12: the payee issues the receipt, wherein the receipt comprises an authenticity certification of a firm and the authenticity certification of the amount, which are made into a data packet data5 and provide a quick response code 5, wherein the quick response code 5 is indicated by QR5:
$SIG_{firm}(time5)=(s10, c10)=sign10;$
$SIG_{firm}(amount)=(s11, c11)=sign111;$
data5={Firm, time5, sign10, amount, sign 11}
wherein
sign10 indicates the authenticity certification of the firm; and sign11 indicates the authenticity certification of the amount.

2. The combination public key based digital currency payment method according to claim 1, further comprising the following step: S13: the receipt is printed on paper or an invoice.

3. The combination public key based digital currency payment method according to claim 1, wherein the quick response code is printed on paper, or stored in an electronic device.

* * * * *

UNITED STATES PATENT AND TRADEMARK OFFICE
CERTIFICATE OF CORRECTION

PATENT NO. : 11,301,842 B2
APPLICATION NO. : 16/464938
DATED : April 12, 2022
INVENTOR(S) : Xianghao Nan It is certified that error appears in the above-identified patent and that said Letters Patent is hereby corrected as shown below:

In the Claims

Claim 1, Column 11, Line 42, after the words "of a" insert the word --firm--.

Claim 1, Column 11, Line 59, after the word "corresponding" insert the word --to--.

Claim 1, Column 11, Line 63, after the word "certification" insert the word --of--.

Claim 1, Column 12, Line 6, after the word "bank" delete the word "is".

Claim 1, Column 14, Line 13, at the end of the line, delete "111" and insert --11--, therefor.

Signed and Sealed this
Fourteenth Day of June, 2022

Katherine Kelly Vidal
*Director of the United States Patent and Trademark Office*